Patented Aug. 31, 1926.

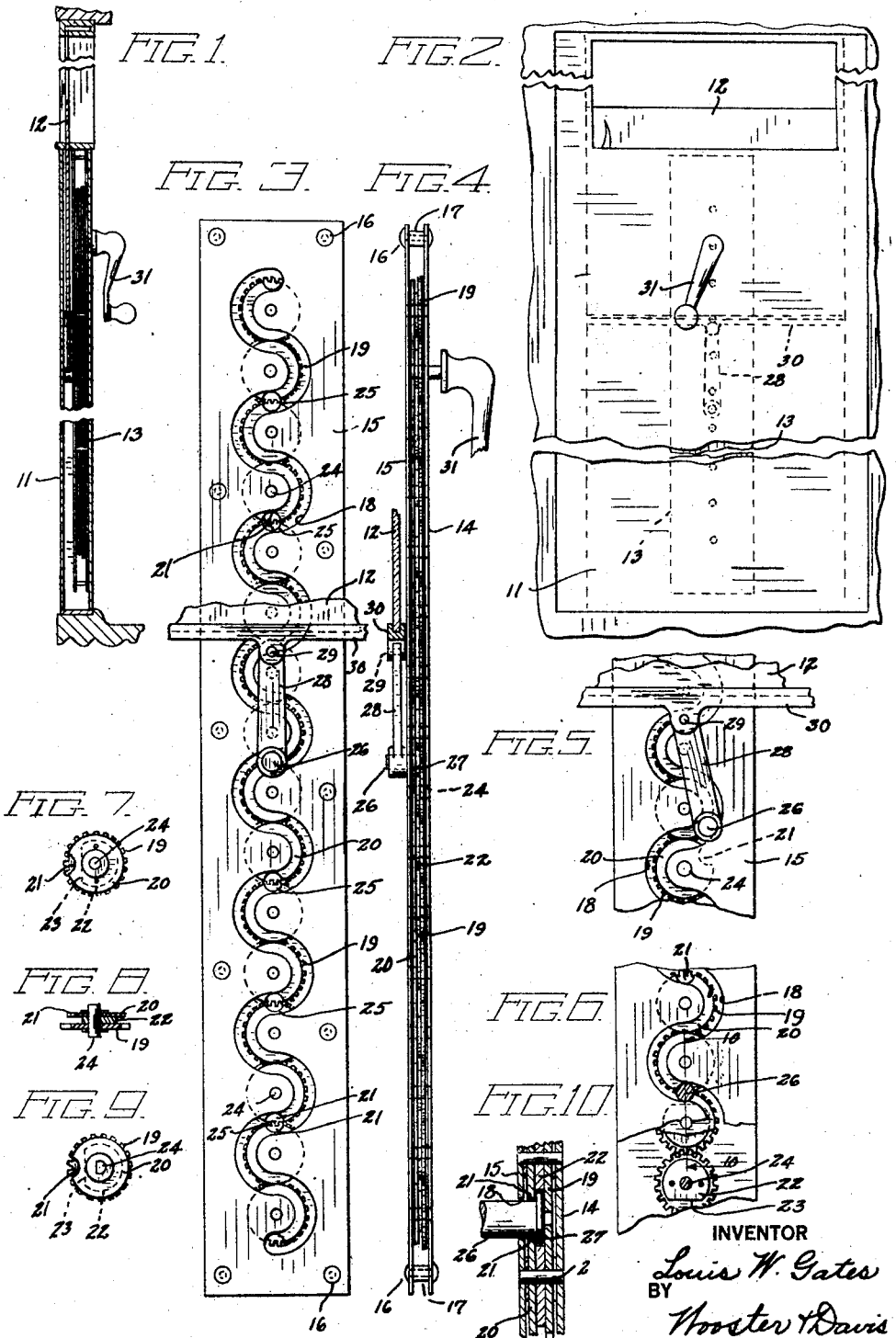

1,598,275

UNITED STATES PATENT OFFICE.

LOUIS W. GATES, OF NEW HAVEN, CONNECTICUT, ASSIGNOR TO C. COWLES AND COMPANY, OF NEW HAVEN, CONNECTICUT, A CORPORATION OF CONNECTICUT.

MECHANICAL MOVEMENT.

Application filed November 28, 1922. Serial No. 603,750.

This invention relates to a mechanical movement of general application although I have shown it as applied for the purpose of raising and lowering a window, and specifically a window of the type used in closed automobiles.

It is an object of the invention to provide a mechanical movement which will move an element in opposite directions as desired and which will secure the element moved against accidental displacement when the mechanism is not operated.

It is a further object of the invention to provide a mechanism of this type which will be simple in construction, may be manufactured at comparatively low cost, will be reliable and efficient in operation, which will occupy comparatively small space, which will be easy to operate and which may be made of any length desired.

With the foregoing and other objects in view, I have devised the construction illustrated in the accompanying drawing, in which—

Fig. 1 is a vertical transverse section through a conventional form of door for a closed automobile showing my device applied thereto.

Fig. 2 is a front elevation thereof.

Fig. 3 is a side elevation of the device on a larger scale.

Fig. 4 is an end view of the same looking from the right of Fig. 3.

Fig. 5 is a side elevation of a portion of the mechanism, showing the movable member in a given position.

Fig. 6 is a similar view showing the movable member in another position, and illustrating how it is transferred from one element to another.

Fig. 7 is a detailed plan view of one of the rotatable elements.

Fig. 8 is a transverse section through the same.

Fig. 9 is a view similar to Fig. 7 showing a slightly different construction, and Fig. 10 is a transverse section substantially on line 10—10, Fig. 6.

Referring to Figs. 1 and 2, number 11 indicates an automobile door hinged in the usual manner and provided with a vertically movable window 12 slidable in vertical guides in the usual manner. In these figures I have illustrated my improved mechanical movement, indicated as a whole in these figures by numerals 13, as mounted within the lower portion of the door and connected with the window to raise and lower the same.

In the embodiment illustrated the device comprises a suitable frame including spaced parallel plates 14 and 15 which may be secured together by any suitable means such as screws, bolts or rivets 16 and held in proper spaced relation by spacing elements 17.

Mounted between these plates are a plurality of rotatable elements, and one of the plates, as 15, is provided with a serpentine guiding slot 18 which slot comprises a plurality of connected arcs substantially concentric with the rotatable elements and with the adjacent arcs curving in opposite directions substantially as shown. In the embodiment shown the rotatable elements comprise intermeshing gears 19 and secured to rotate with each gear is a disk 20 provided in the periphery thereof with a recess 21, preferably substantially semi-circular as illustrated. These plates are spaced from the gears by suitable spacing washers 22 which are preferably cut away at one side as at 23 for a purpose presently to be described. The gears, disks and spacing washer may be secured to rotate together in any suitable manner, but they are preferably mounted upon a pin or shaft 24 and secured thereto by any means desired, and which pin has bearings at its opposite ends in the plates 14 and 15. When assembled between the plates the rotatable elements are so arranged that the recesses 21 on adjacent disks will become opposed upon each revolution of these elements, as shown at 25 in Fig. 3.

Extending through the slot 18 and guided thereby is a movable member 26, in the form shown comprising a cylindrical pin provided with an enlarged head or flange 27 at its inner end and adapted to be secured to an element to be reciprocated by suitable means, as a link 28. This link is shown as having pivotal connection with this element at one end and at its other end is pivoted, as shown at 29, to a crossbar 30 which supports the window 12. When assembled the movable member 26 projects through the slot 18 and is guided thereby and also is received in a recess 21 in one of the disks 20 with its head or flange 27 between this disk and its gear 19, as shown in Fig. 10. It will thus be apparent that this head or flange retains the element in position and prevents its removal through the slot. It also acts as a guide and bracing element between the gear and disk to prevent cramping of the movable member under pressure. Means is provided for rotating the gears and disks such as a crank 31 secured to the pin or shaft 24 of any one of the rotatable elements desired.

In operation the rotation of the crank 31 will rotate the element to which it is secured and through the intermeshing gears will simultaneously rotate all the other elements, the adjacent elements, however, rotating in opposite directions as will be obvious. As a disk 20 rotates the recess 21 carried by this disk will be moved on the arc of the circle substantially concentric with the adjacent arc of the slot 18, and as the movable element 26 is seated in this recess and is guided by the arc of the slot it will move with the recess and be carried thereby through this arc. When the recess 21 comes next to an adjacent disk, the corresponding recess 21 of this disk becomes opposed to that in the first disk, as shown at 25 in Fig. 3, allowing the movable member 26 to pass between the disks, as shown in Fig. 6. However, as the disks continue to rotate this member will remain in the recess of the second disk and will be carried through the corresponding arc of the slot 18 to the next adjacent disk or rotatable element, and so on through the length of the slot 18 as long as the elements are rotated. By rotating the elements in the opposite directions it will be evident the member 26 will be moved in the opposite direction along the slot 18. These movements will be positive and any element connected thereto, as the window shown, will move therewith, the pivotal connections allowing for the transverse movement of this member. The cutaway portion 23 in the spacing washer allows the plate or flange 27 to pass by this washer. From an inspection of Fig. 3 it will be clear that as the member 26 passes between two disks the center thereof will be on the line joining the axis of rotation of these two disks, and, therefore, as the pressure of the element to be operated, as the window, is directed along this line and there is no lateral component the window will be locked in this position, and so will not fall of its own accord. If desired, however, suitable automatic locking mechanism may be provided by an operating crank or handle 31 such as that disclosed in the patent to Bulley, No. 1,338,485, dated April 27, 1920.

It will be apparent from the foregoing description that the device is very simple and may be constructed principally of elements stamped from sheet metal, so that it will be comparatively cheap to manufacture. Also that the element moved by this mechanism is given positive reciprocatory movement in either direction, and that the mechanism may be made of any length desired by merely increasing or decreasing the number of rotatable elements and the arcs of the slot 18 corresponding therewith. Although I have shown the disk, the gears, and spacing washer as separate elements secured together they may be formed in one piece with recesses 21 for the member 26 and clearance for the head or flange 27 milled in the periphery thereof. Other arrangements of means for rotating the rotatable elements may also be employed as desired, but the series of intermission gears, as shown, appears to be the simplest. Although I have shown and described the device as used for raising and lowering a window, it will be apparent it is not confined to this use but may be applied to move other elements back and forth as desired.

Having thus set forth the nature of my invention, what I claim is:—

1. In a device of the character described, a movable closure spaced plates, a series of intermeshing gears rotatably mounted between said plates, one of said plates being provided with a serpentine guiding slot comprising arcs substantially concentric with said gears, a movable member extending through said slot and guided thereby, a disk secured to rotate with each gear, spacing washers between the disks and gears, each disk being provided in its periphery with a recess adapted to receive said member and so arranged that the recess in adjacent disks will become opposed upon each revolution of the disks, said member being provided with an enlarged head or flange between the disks and gears, means connecting said member with the closure to operate said closure, and means for rotating the gears.

2. In a device of the character described, a vertically movable closure, a pair of spaced upright plates, a series of intermeshing gears carried by said plates, one of said plates being provided with a serpentine guiding slot comprising connected arcs substantially concentric with said gears and with adjacent arcs curved in opposite directions, a movable member in said slot and guided thereby, a disk secured to rotate with each gear, each disk being provided in its periphery with a recess adapted to receive said movable member and so arranged that recesses in adjacent disks will become opposed upon each revolution of the disks, means connecting the movable member with the closure to operate said closure, and means for rotating the gears.

3. In a device of the character described, a vertically movable closure, a pair of spaced upright plates, a series of intermeshing gears carried by said plates, one of said plates being provided with a serpentine guiding slot comprising connected arcs substantially concentric with said gears and with adjacent arcs curved in opposite directions, a movable member in said slot and guided thereby, a disk secured to rotate with each gear, each disk being provided in its periphery with a recess adapted to receive said movable member and so arranged that recesses in adjacent disks will become opposed upon each revolution of the disks, a link pivoted to the closure at a point substantially in a line passing through the centers of the disks, said link being also pivoted to said movable member, and means for rotating the gears.

In testimony whereof I affix my signature.

LOUIS W. GATES.